United States Patent [19]

Aguet

[11] Patent Number: 4,637,212
[45] Date of Patent: Jan. 20, 1987

[54] COMBINED HOT AIR TURBINE AND STEAM POWER PLANT

[75] Inventor: Emile Aguet, Winterthur, Switzerland

[73] Assignee: Sulzer Brothers Limited, Winterthur, Switzerland

[21] Appl. No.: 844,480

[22] Filed: Mar. 26, 1986

[30] Foreign Application Priority Data

Apr. 29, 1985 [CH] Switzerland ............... 01805/85

[51] Int. Cl.⁴ ............................................ F01K 23/10
[52] U.S. Cl. ................................................. 60/655
[58] Field of Search ................ 60/655, 650, 682, 683, 60/39.182

[56] References Cited

U.S. PATENT DOCUMENTS

| 2,471,755 | 5/1949 | Karrer | 60/655 |
| 4,116,005 | 9/1978 | Willyoung | 60/655 |
| 4,253,300 | 3/1981 | Willyoung | 60/39.182 |
| 4,462,206 | 7/1984 | Aguet | 60/39.182 |

*Primary Examiner*—Allen M. Ostrager
*Attorney, Agent, or Firm*—Kenyon & Kenyon

[57] ABSTRACT

The hot air exchanger in the steam generator is connected to the outlet of the air compressor and the inlet of the hot air turbine for driving the compressor. A presuperheater in the waste air boiler receives steam from the water-steam separator which, in turn, delivers the steam to the steam turbine for an electricity generator. An air preheater is disposed to preheat the incoming combustion air by means of the flue gases from the steam generator. A branch line from the exhaust air boiler may also use the waste air for preheating the incoming combustion air.

17 Claims, 1 Drawing Figure

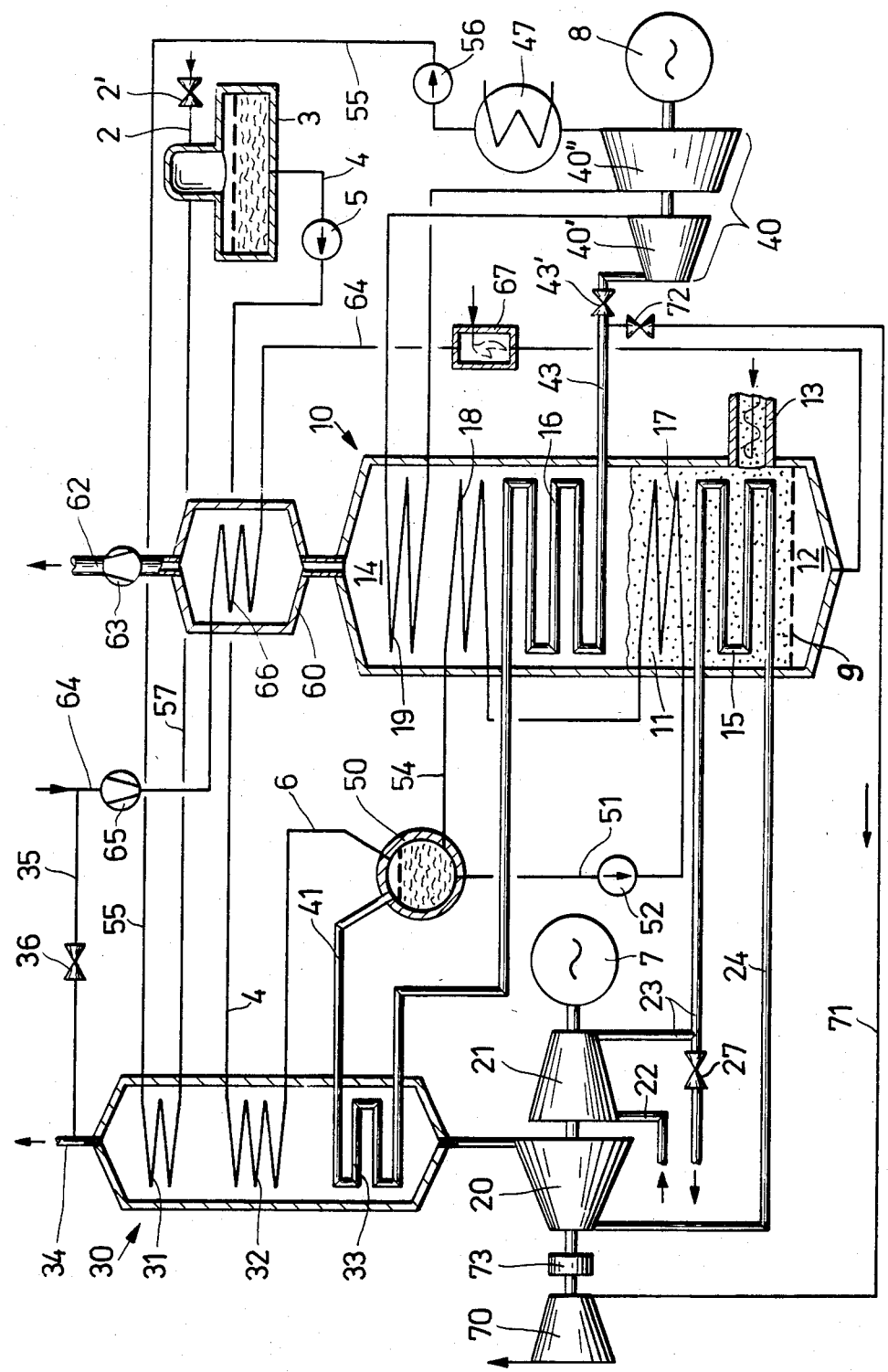

COMBINED HOT AIR TURBINE AND STEAM POWER PLANT

This invention relates to a combined hot air turbine and steam power plant.

Heretofore, various types of combined plants have been known for the production of electricity. For example, some of these combined plants have been constructed with a steam generator in which a fluidized bed combustion zone is created and a smoke flue through which hot gas may be conveyed. In addition, at least one air compressor which is driven by a hot air turbine is provided to deliver compressed air into one or more air heat exchangers or preheaters disposed within the steam generator while the hot air turbine exhausts to at least one waste heat boiler. In such a combination, at least one water-steam separator vessel has been disposed between an evaporator system and a superheater disposed within the steam generator. A suitable steam turbine has also been connected to the output of the superheater.

In plants of this type, the turbines have been coupled with electricity generators in order to produce electricity. Such plants generally have a higher efficiency than pure gas or pure steam power plants.

An important characteristic of the known combined plants is the exploitation of the thermal energy of the exhaust air from the hot air turbine. To this end, the exhaust air is usually conveyed to a recuperator in order to yield heat to the air compressed in the air compressor. Thereafter, the exhaust air is used in the waste air boiler in order to preheat the feed water to the steam generator. The air preheater following the recuperator is usually subdivided into three parts, the first and third of which are disposed in the smoke flue of the steam generator and the second of which is disposed in the fluidized bed. However, one disadvantage of such a plant is that the path along which the compressed air must travel between the outlet of the air compressor and the inlet of the hot air turbine is long. Further, this path contains many deflections and therefore causes substantial pressure drops and prevents any further increase in efficiency from being achieved.

Accordingly, it is an objection of the invention to provide a simple low-cost means to exploit the heat of the exhaust air of a combined hot air turbine and steam power plant.

It is another object of the invention to reduce pressure drops between an air compressor outlet and a hot air turbine inlet without impairment of the exploitation of the heat of the exhaust air from a hot air turbine and steam power plant.

It is another object of the invention to provide a combined plant of increased efficiency.

Briefly, the invention provides a combined hot air turbine and steam power plant which employs a steam generator and at least one waste heat boiler.

The steam generator has means for creating a fluidized bed in a combustion zone thereof, a smoke flue for exhausting hot gases, at least one air heat exchanger disposed within the fluidized bed, an evaporator and a superheater.

In addition, the plant has at least one compressor connected to the air heat exchanger in order to deliver a flow of compressed air thereto as well as a hot air turbine connected to the air heat exchanger in order to receive a flow of hot air therefrom. This turbine is also connected to the compressor in order to drive the compressor.

The waste heat boiler is connected to the hot air turbine in order to receive hot waste air therefrom and has at least one pre-superheater connected to the superheater in the steam generator in order to deliver a flow of steam thereto.

The plant also has a water-steam separator connected to and between the evaporator and the pre-superheater in order to deliver a flow of steam from the evaporator to the presuperheater as well as a steam turbine which is connected to the superheater to receive a flow of steam therefrom.

In this plant much of the exhaust air heat is used to pre-superheat the steam, sufficient heat being available from the fluidized bed firing to provide complete preheating of the compressed air. This permits the conventional recuperator to be eliminated. The pressure drops between the air compressor and the hot air turbine are therefore reduced considerably.

Another advantage of the plant resides in the better use of the heat in the fluidized bed firing since the air temperature at the air heat exchanger outlet is closer to the temperature of the fluidized bed than in previously known plants. This presents a further improvement in the overall efficiency of the plant.

The above arrangement may be used in forced circulation steam generators, in forced through-flow steam generators and in natural circulation steam generators. Considerable freedom in the arrangement of the heating surfaces is permitted in the steam generator because all the steam-carrying heat exchangers can be disposed outside the fluidized bed and are, therefore, not attacked by elevated temperature, chemical corrosion and wear in the fluidized bed. Consequently, only the less delicate heat exchangers which carry air and feed water are disposed in the fluidized bed.

In accordance with the invention, the pre-superheater may be disposed in the hottest zone of the waste heat boiler while the evaporator is disposed in the fluidized bed while a second evaporator is disposed in the smoke flue.

The residual heat of the smoke gases from the steam generator may be used to preheat the air to be supplied to the fluidized bed. In this regard, an air preheater having a primary side for receiving a flow of air for delivery to the fluidized bed has a secondary side connected to the smoke flue in order to receive the heated gas. In addition, a blower is provided for blowing atmosphere air into the primary side of the air preheater. A means for connecting the waste heat boiler with the blower may also be provided in order to deliver a controlled flow of heated air to the blower. In this case, the supply of hot waste air to the blower eliminates low-temperature corrosion in the air preheater.

An auxiliary combustion chamber may also be provided between the air preheater and the means for creating the fluidized bed in order to heat the flow of air prior to delivery to the fluidized bed. The arrangement of a small auxiliary combustion chamber faciliates the preheating of the bed material upon starting of the plant.

An auxiliary steam turbine may also be selectively coupled to the hot air turbine in order to drive the hot air turbine at start-up. In addition, a means is provided to selectively connect the superheater to the auxiliary turbine in order to deliver a controlled flow of steam thereto. Thus, the steam produced at start-up can be used to run the hot air turbine up to the self maintaining minimum speed. On partial load, the auxiliary steam turbine prevents premature shutdown of the hot air turbine.

The air compressor may be sized to deliver an amount of air to the hot air exchanger which is at least twice the stoichiometric quantity of air necessary for combustion of fuel delivered to the fluidized bed. This presents a preferred relative air quantity which ensures an advantageous ratio between the quantity of feed water or the quantity of steam and the quantity of exhaust air. This ensures satisfactory temperature patterns for the heating medium and for the medium to be heated.

A means for controlled blow-off of compressed air to atmosphere may also be provided between the outlet of the compressor and the inlet of the hot air turbine. This enables the speed of the hot air turbine to be kept under control at start-up from minimum speed up to synchronization speed.

These and other objects and advantages of the invention will become more apparent from the following detailed description taken in conjunction with the accompanying drawing wherein:

The drawing schematically illustrates a combined plant constructed in accordance with the invention.

Referring to the drawing, the combined hot air turbine and steam power plant includes a controlled circulation steam generator 10, a hot air turbine 20 coupled by a common shaft to an air compressor 21 and an electricity generator 7. In addition the plant has at least one waste heat boiler 30, a steam turbine 40 including a high pressure stage 40' and a low pressure stage 40" coupled with a second electricity generator 8, a water-steam separator 50 and an air preheater 60.

The steam generator 10 has means for creating a fluidized bed 11 in a combustion zone. In this regard, the fluidized bed 11 is supplied with solid fossil fuels via a feed screw 13 together with solid chemical additives in order to clean a resulting exhaust gases. As indicated, the fluidized bed is created by means of a flow of air which is supplied from an air chest 12 through a perforated base 9. The air which is thus supplied is also operative as combustion-supporting air for the combustion of the fuel within the fluidized bed 11. In order to improve combustion conditions secondary air may also be introduced into the fluidized bed 11 or above the bed 11 by suitable means (not shown).

The steam generator also includes a smoke flue 14 above the fluidized bed 11 for exhausting hot gases from the generator 10.

In addition, the steam generator includes at least one air heat exchanger 15 which is disposed in the lowest zone of the fluidized bed 11 and an evaporator 17 which is disposed in the fluidized bed 11. In addition, a superheater 16 is disposed in the lowest and the hottest zone of the smoke flue 14 while a second evaporator 18 is disposed above the superheater 16 and a re-superheater or an intermediate superheater 19 is disposed in the top and coolest zone of the flue 14. As indicated, the evaporators, 17, 18 are connected in a series in order to convey a working medium therethrough.

The air compressor 21 communicates with atmosphere by way of an air supply line 22 and has an outlet which communicates directly by way of a delivery line 23 with the air heat exchanger 15 in the steam generator 10. A means in the form of a blow-off valve 27 is also connected to the line 23 in order to permit a controlled blow-off of compressed air to atmosphere in order to reduce the pressure in the delivery line 23.

The hot air turbine 20 is connected to an outlet of the air heat exchanger 15 in order to receive a flow of hot air therefrom via a hot air line 24. As indicated, the turbine 20 is connected to the compressor 21 via a common shaft in order to drive the compressor 21.

The waste heat boiler 30 is connected to an outlet of the hot air turbine 20 in order to receive hot waste air from the turbine 20. As indicated, the waste heat boiler 30 is vertically disposed and houses at least one steam pre-superheater 33 in the hottest zone, a condensate preheater 31 in the coolest zone and a feed water preheater 32 between the pre-superheater 33 and preheater 31. In addition, an air vent line 34 connects the top zone of the boiler 30 either to atmosphere or to other consumers for any residual heat remaining in the exhaust air, such as the heating systems of buildings.

The water-steam separator 50 is connected to and between the evaporator 18 of the steam generator 10 and the pre-superheater 33 of the waste heat boiler 30 in order to deliver a flow of steam from the evaporator 18 to the pre-superheater 33. As indicated, a steam line 41 connects a steam outlet at the upper end of the water-steam separator 50 to an inlet of the pre-superheater 33. In addition, an outlet of the steam pre-superheater 33 is connected to an inlet of the superheater 16 in the steam generator 10. Also, a steam line 43 connects an outlet of the superheater 16 to the steam turbine 40 in order to deliver a flow of steam thereto. A turbine valve 43' is also disposed in the steam line 43 in order to control the flow of steam to the high pressure stage 40' of the steam turbine 40. The intermediate superheater 19 of the steam generator is disposed between the stages 40', 40" of the turbine to convey steam there between while the low pressure stage 40" exhausts to a condenser 47.

The condenser 47 communicates with the condensate preheater 31 in the waste heat boiler 30 by way of a line 55 having a condensate pump 56 therein. In addition, the outlet of the condensate preheater 31 communicates by way of a line 57 with the top part of a deaerator or degassifier 3. A make-upline 2 having a valve 2' also extends into the top part of the degassifier 3 as is known. The bottom zone of the degassifier 3 is connected to the feed water preheater 32 in the boiler 30 by way of a feed water line 4 having a pump 5 therein. Further, the preheater 32 communicates by way of a line 6 with the water-steam separator 50.

As indicated, the bottom zone of the water-steam separator 50 is connected via a line 51 in which a circulating pump 52 is disposed with the evaporator 17 in the fluidized bed 11. Another line 54 connects the outlet of the evaporator 18 with the water-steam generator 50.

The air preheater 60 communicates by way of a smoke gas line with the top end of the smoke flue 14 and, by way of a discharge line 62 with a smoke gas blower 63 for exhaust of the hot gases from the flue 14. The discharge line 62 may communicate either with atmosphere or with facilities (not shown) for further utilization of the residual heat contained in the flue gases. Suitable flue gas cleaning facilities may also be interposed into the discharge line 62.

A heating surface 66 is also disposed within the air preheater 60. This heating surface 66 is connected to a line 64 which carries combustion-supporting air which is to be delivered to the air chest 12 in the steam generator 10. As indicated, an air blower 65 is disposed in the line 64 for blowing atmospheric air into the heating surface 66 which acts as the primary side of the air preheater 60 so as to be heated by the flue gases passing through the preheater 60 on the secondary side. In addition, an auxiliary combustion chamber 67 is disposed in the line 64 between the preheater 60 and the air chest 12 for heating the flow of air to the fluidized bed 11. Still further, means in the form of a line 35 with a control valve 36 connects the air vent line 34 of the waste heat boiler 30 with the line 64 upstream of the blower 65 in order to deliver a controlled flow of reheated air thereto.

An auxiliary steam turbine 70 is selectively coupled to the hot air turbine 20 via a suitable coupling 73 in order to drive the hot air turbine 20. In addition, a means in the form of an auxiliary steam line 71 containing a steam valve 72 is connected to the steam line 43 from the superheater 16 in order to selectively connect the superheater 16 to the auxiliary steam turbine 70 in order to deliver a controlled flow of steam thereto.

During normal operation of the plant, the turbine valve 43' is opened, the steam valve 72 is closed and the auxiliary combustion chamber 67 is inoperative. During this time, the blower 65 intakes air from atmosphere and delivers the air through the combustion-supporting air line 64 to the preheater heating surface 66 and thence to the air chest 12. The control element 36 is at such a setting that some of the air flowing in the air discharge line 34 from the boiler 30 passes through the branch line 35 to the air intake line 64 and heats the drawn in combustion-supporting air sufficiently to prevent low-temperature corrosion in the air blower 65 and in the air preheater 60.

The combustion-supporting air flows from the air chest 12 through the perforated base 9 into the fluidized bed 11 while the feed screw 13 introduces the requisite quantities of fuel and chemicals into the fluidized bed 11. As noted previously, the chemicals serve to bind the harmful substances produced during combustion.

The smoke gas blower 63 operates to convey the smoke or flue gases from the gas flue 14 and the air preheater 60 to the gas discharge line 62. At this time, the flue gases yield their heat to the working medium in the heating surfaces 16, 18, 19 and to the air in the heating surface 66.

The air compressor 21 also intakes air from atmosphere through the air supply line 22, compresses the air thus intaken and delivers the air through the line 23 to the heat exchanger 15, the blow-off valve 27 being in the closed state. The compressed air receives heat from the fluidized bed 11 in the heat exchanger 15 and then flows through the hot air line 24 to the hot air turbine 20. After expansion in the turbine 20, the air flows to the waste heat boiler 30 and yields heat seriatim to the working medium in the heating surfaces 33, 32, 31. Thereafter, the air, cooled by now almost to ambient temperature, leaves the boiler 30 through the line 34.

The condensate pump 56 conveys condensate through the line 55 and condensate preheater 31 in the boiler 30 to the degassifier 3. Any losses of water and/or steam in the plant are replaced by fresh water being added to the degassifier 3 via the line 2. In this regard, the valve 2' is operated to permit the water to be supplied through the make-up line 2. The feed water pump 5 pumps the water which has been degassified in the degassifier 3 through the feed water heater 32 into the water-steam separator 50. The circulating pump 52 conveys the feed water from the separator 50 to the evaporator 17 in the fluidized bed 11. The water then receives heat from the fluidized bed 11 and starts to evaporate. Thereafter, the water passes to the second evaporator 18 and is further evaporated by receiving heat from the flue gases and finally returns through the line 54 to the separator 50. The water is then separated from the steam and the steam flows through the line 41 to the pre-superheater 33 in the boiler 30 wherein the temperature of the steam is increased by receiving heat from the exhaust air.

The steam passing from the pre-superheater 33 receives further heat from the flue gas in the steam superheater 16 and flows at a final temperature to the high-pressure stage 40' of the steam turbine 40. After partial expansion therein, the steam is re-superheated in the re-superheater 19 by receiving heat from the flue gas. The steam is then further expanded in the low-pressure stage 40" of the steam turbine 40. The steam thereafter passes to the condenser 47 and is condensed for a return cycle in the form of condensate.

The steam turbine 40 drives the generator 8 which, as the generator 7, generates the electricity for general use.

When the plant is initially started, the smoke blower 63, the air blower 65 and the auxiliary combustion chamber 67 are operated first. The fluidized bed 11 is then produced and preheated. Thereafter, and consecutively, the circulating pump 52 is started, the fluidized bed 11 is ignited and the feed screw 13 is started. The auxiliary combustion chamber 67 can then be shut down.

Once sufficient steam is available, the steam valve 72 is opened and the turbine valve 43' closed, at least to some extent. Steam is thus supplied through the auxiliary steam line 71 to the auxiliary steam turbine 70 which is coupled to the hot air turbine 20 by the coupling 73. The steam turbine 70 is thus able to drive the air turbine 20 until the turbine 20 has run up to a minimum speed. In these circumstances, the blow-off valve 27 is at least partially open so that at least some of the compressed air produced by the compressor 21 returns to atmosphere instead of flowing through the air heat exchanger 15. This ensures that warming-up of the bed 11 is not delayed because of a cooling action caused by the compressed air. Also, the load on the auxiliary steam turbine 70 is reduced.

When the hot air turbine 20 has run up to the minimum speed, the auxiliary steam turbine 70 is disconnected, the steam valve 72 is closed and the turbine valve 43' opened, if necessary. The blow-off valve 27 closes a little but continues to remain operative until the first generator 7 has run up to synchronous speed in order to keep the speed of the hot air turbine 20 under control.

All of the remaining components of the plant are brought into operation in a known manner and are not further described.

Alternatively, the plant may be constructed so that the number and the distribution of the heating surfaces both in the steam generator 10 and in the exhaust air boiler 30 can be varied in dependence upon design parameters.

The steam turbine 40 may have only a single stage or three stages instead of two stages and may or may not have re-superheating. Another possibility is to provide bypasses to cut some heating surfaces out of operation so that, for example, a water preheater or an evaporator can be brought into operation only in a relatively late phase of starting.

Pumps may be omitted or added in accordance with the nature of operations and the construction of the plant. A re-circulating fluidized bed can also be used instead of a static fluidized bed. The solid particles may also be introduced into the fluidized bed 11 by means other than a feed screw 13.

In some circumstances, the air supply to the fluidized bed can be derived from sources other than as shown. Further, the combustion-supporting air and the fluidizing air may be supplied separately.

The gas blower 63 may, if required, be omitted.

Instead of the auxiliary steam turbine 70 being used to start the hot air turbine 20 some other form of drive can be used for this purpose. More particularly, the generator 7 can be operated as a motor.

For the sake of safety, the pumps and control elements can be provided in multiple redundant form and may be connected in series or in parallel.

Conveniently, the evaporators 17, 18, instead of being convection heating surfaces in the steam producer 10 may be in the form of wall heating surfaces having tubes which are interconnected by webs. In this case, the wall heating surfaces forming boundary walls of the fluidized bed 11 and flue 14.

The auxiliary steam turbine 70 is used on very low loads as well as for starting in order to prevent premature shutdown of the hot air turbine 20. In this way, the load can be increased rapidly.

If the steam generator is in the form of a forced through-flow boiler, the water-steam separator 50 is replaced by a water separator having a water outlet which can be connected to the degassifier of the feed water system. In the case of combined circulation steam generators, at least some of the water separated out in the water separator is returned by means of a circulating pump between the feed pump and the evaporator inlet.

The invention thus provides a combined hot air turbine and steam power plant which provides a relatively short travel for the compressed air from the compressor to the hot air turbine without deflections and substantial pressure drops. As such, the invention provides for an increase in the efficiency of the plant.

What is claimed is:

1. A combined hot air turbine and steam power plant comprising
    a steam generator having means for creating a fluidized bed in a combustion zone thereof, a smoke flue for exhausting hot gases, at least one air heat exchanger disposed within the fluidized bed, an evaporator and a superheater;
    at least one compressor connected to said air heat exchanger to deliver a flow of compressed air thereto;
    a hot air turbine connected to said air heat exchanger to receive a flow of hot air therefrom and connected to said compressor to drive said compressor;
    at least one waste heat boiler connected to said turbine to receive hot waste air therefrom and having at least one pre-superheater therein connected to said superheater in said steam generator to deliver a flow of steam thereto;
    a water-steam separator connected to and between said evaporator and said pre-superheater to deliver a flow of steam from said evaporator to said pre-superheater; and
    a steam turbine connected to said superheater to receive a flow of steam therefrom.

2. A plant as set forth in claim 1 wherein said pre-superheater is disposed in the hottest zone of said waste heat boiler.

3. A plant as set forth in claim 1 which further comprises at least one steam re-superheater disposed in said smoke flue.

4. A plant as set forth in claim 2 wherein said evaporator is disposed in the fluidized bed and which further comprises a second evaporator in said smoke flue connected to said evaporator in the fluidized bed.

5. A plant as set forth in claim 1 which further comprises an air preheater having a primary side for 1 receiving a flow of air for delivery to the fluidized bed and a secondary side connected to said smoke flue to receive heated gas and a blower for blowing atmospheric air into said primary side of said air preheater.

6. A plant as set forth in claim 5 which further comprises means for connecting said waste heat boiler with said blower to deliver a controlled flow of heated air thereto.

7. A plant as set forth in claim 5 which further comprises an auxiliary combustion chamber between said air preheater and said means for creating the fluidized bed for heating the flow of air to the fluidized bed.

8. A plant as set forth in claim 1 which further comprises an auxiliary steam turbine selectively coupled to said hot air turbine to drive said hot air turbine and means selectively connecting said superheater to said auxiliary steam turbine to deliver a controlled flow of steam thereto.

9. A plant as set forth in claim 1 wherein said air compressor is sized to deliver an amount of air to said hot air turbine which is at least twice the stoichiometric quality of air necessary for combustion of fuel delivered to the fluidized bed.

10. A plant as set forth in claim 1 which further comprises means for a controlled blow-off of compressed air to atmosphere between said compressor and said hot air turbine.

11. In a combined hot air turbine and steam power plant, the combination comprising
    a steam generator having means for creating a fluidized bed in a combustion zone thereof, at least one air heat exchanger in the fluidized bed in said combustion zone, an evaporator and a superheater;
    at least one compressor connected to said air heat exchanger to deliver a flow of compressed air thereto;
    a hot air turbine connected to said air heat exchanger to receive a flow of hot air therefrom and connected to said compressor to drive said compressor;
    at least one waste heat boiler connected to said turbine to receive hot waste air therefrom and having at least one pre-superheater therein connected to said superheater in said steam generator to deliver a flow of steam thereto;
    a water-steam separator connected to and between said evaporator and said pre-superheater to deliver a flow of steam from said evaporator to said pre-superheater; and
    a steam turbine connected to said superheater to receive a flow of steam therefrom.

12. The combination as set forth in claim 11 wherein said evaporator is disposed in the fluidized bed to convey a flow of working medium therethrough in heat exchange relation.

13. The combination as set forth in claim 12 which further comprises a second evaporator in said steam generator connected between and to said evaporator in the fluidized bed and said steam separator to convey the working medium to said steam separator.

14. The combination as set forth in claim 11 which further comprises an air preheater having a primary side for receiving a flow of air for delivery to the fluidized bed and a secondary side connected to said steam generator to receive a flow of heated gas and a blower for delivering air to said primary side of said air preheater.

15. The combination as set forth in claim 11 which further comprises means for connecting said waste heat boiler with said blower to deliver a controlled flow of heated air thereto.

16. The combination as set forth in claim 11 which further comprises an auxiliary combustion chamber between said air preheater and said means for creating the fluidized bed for heating the flow of air to the fluidized bed.

17. The combination as set forth in claim 11 which further comprises an auxiliary steam turbine selectively coupled to said hot air turbine to drive said hot air turbine and means selectively connecting said superheater to said auxiliary steam turbine to deliver a controlled flow of steam thereto.

* * * * *

UNITED STATES PATENT AND TRADEMARK OFFICE
CERTIFICATE OF CORRECTION

PATENT NO. : 4,637,212

DATED : January 20, 1987

INVENTOR(S) : EMILE AGUET

It is certified that error appears in the above-identified patent and that said Letters Patent is hereby corrected as shown below:

```
Column 2, line 11 "presuperheater" should be -Pre-superheater-
Column 2, line 60 "faciliates" should be -facilitates-
Column 3, line 31 "addition the" should be -addition, the-
Column 3, line 40 "clean a resulting" should be -clean resulting-
Column 7, line 23 "forming" should be -form-
Column 8, line 12 "for 1 re-" should be -for re- -
Column 8, line 62 "superheater, and" should be superheater; and-
```

Signed and Sealed this

Fifteenth Day of September, 1987

*Attest:*

DONALD J. QUIGG

*Attesting Officer*     Commissioner of Patents and Trademarks